W. WARWICK & H. C. DUGGAN.
Car-Brakes.

No. 144,240.  Patented Nov. 4, 1873.

Witnesses.
A. Ruppert.

Inventors.
Wm. Warwick
H. C. Duggan

UNITED STATES PATENT OFFICE.

WILLIAM WARWICK AND HENRY C. DUGGAN, OF PITTSBURG, PA.

IMPROVEMENT IN CAR-BRAKES.

Specification forming part of Letters Patent No. 144,240, dated November 4, 1873; application filed September 6, 1873.

*To all whom it may concern:*

Be it known that we, WILLIAM WARWICK and HENRY C. DUGGAN, of Pittsburg, in the county of Allegheny and State of Pennsylvania, have invented certain Improvements in Car-Brakes, of which the following is a specification:

This invention relates to the brake-bars and attachments of railroad-car brakes; and our improvement consists, first, in constructing the brake-bar of a center-beam of cast-iron, or other suitable material, bound with a wrought-iron strap, which wholly encircles the center-beam, and is furnished with massive solid ends for the attachment of the brake-blocks or clogs; second, in constructing the brake-blocks, which may be made of wrought-iron, and welded to or shrunk upon the wrought-iron ends of the brake-bar, with center bearings, for taking up the strain upon the brake-shoes, which are provided with suitable lugs upon their backs, so connecting them to the center bearings of the clogs that no strain shall come upon the bolts locking the shoes to the clogs.

Figure 1:
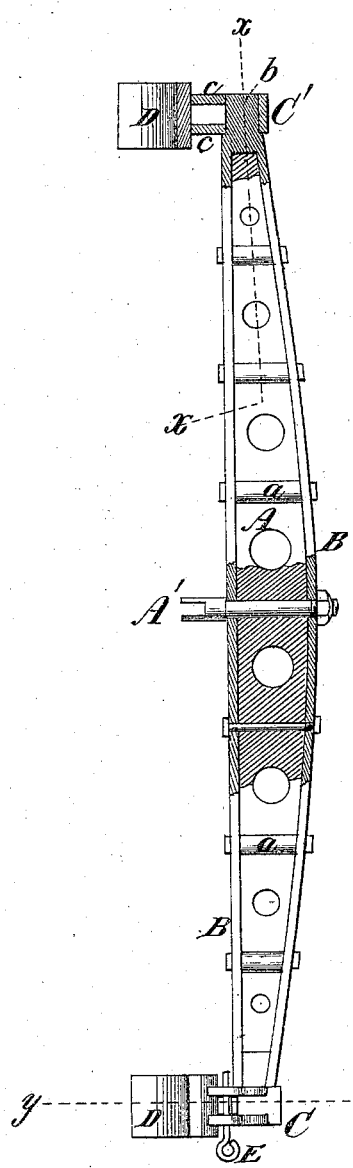
Figure 2:
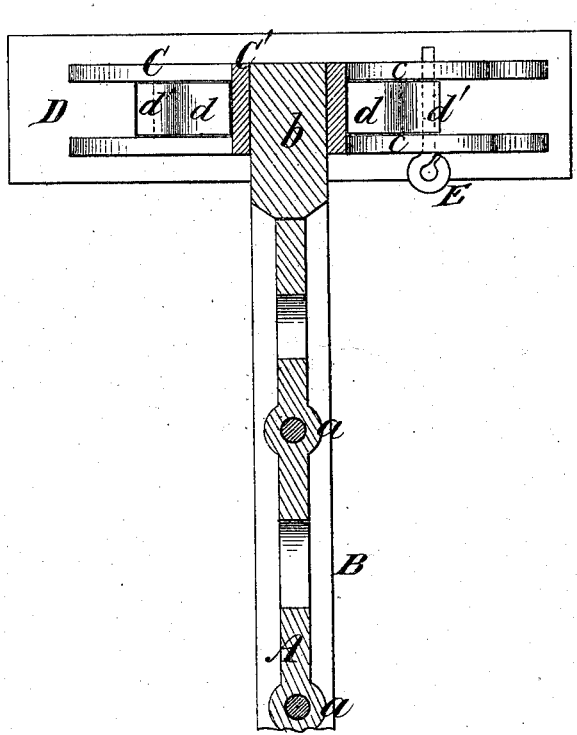
Figure 3:
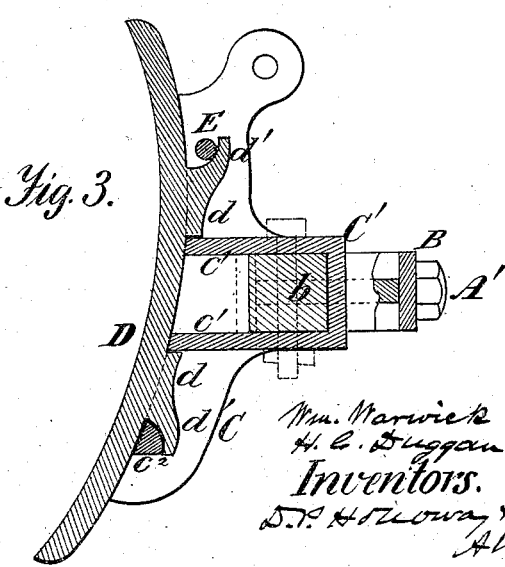

Figure 1 is a sectional plan view of our improved brake-bar and attachments. Fig. 2, drawn on a larger scale, is a section in the plane indicated by the line $x\,x$, Fig. 1. Fig. 3, also drawn on a larger scale than Fig. 1, is a section indicated by the line $y\,y$, Fig. 1.

The same letters of reference are used in all the figures in the designation of identical parts.

The brake-bar proper consists of the center-beam A, bound with the wrought-iron strap B. The center-beam may be made of wood; but we preferably construct it of cast-iron, in the arched form already shown in Fig. 1. The beam illustrated has a series of tubular bosses, $a$, formed across it, the center one of which receives the eyebolt A', to which the brake mechanism is connected. The other bosses receive bolts for securing the strap B to the center-beam; but, in lieu of this manner of fastening the beam and strap together, the latter may be shrunk upon the former. The wrought-iron strap entirely encircles the center-beam, and massive solid wrists $b$ are formed on it at each end, for the attachment of the brake-blocks or clogs C. These wrists are made square, fitting a corresponding socket, C', on the clog.

When the clogs are made of wrought-iron, they will be welded to the wrought-iron wrists $b$ of the brake-bar, or they may be shrunk upon them. In either case, the clogs are so intimately and firmly connected to the bar as to really become integral parts thereof. The clogs may, however, be riveted or bolted to the bar, as indicated in dotted lines in Fig. 3.

Each clog consists of two suitably-curved cheeks, $c\,c$, extending above and below the socket C', from which plates $c^1\,c^1$ project to the forward edges of the cheeks, as best seen in Fig. 3, forming a center bearing for the support of the shoes D. These are preferably made of wrought-iron, and furnished, upon their backs, with lugs $d\,d$, which, when the shoes are placed on the clogs, snugly embrace the center bearing $c^1\,c^1$ thereof, so that whatever strain comes upon the shoes will be transmitted directly to the center bearing of the clog. The outer ends of the lugs $d$ terminate in hooks $d'$, the lower one of which hooks over a cross-bar, $c^2$, of the clogs, while a bolt, E, inserted in the cheeks of the clogs, passes in front of the upper hook to lock the shoe on the clog.

It will be observed that neither the cross-bar $c^2$ nor the lock-bolt E has to sustain any strain, which is wholly taken up by the center bearing of the clog. The same end may be attained by forming a central tenon or shank on the back of the shoes, fitting the space between the plates $c^1\,c^1$.

The shoes can be reversed at pleasure, so that they can be entirely used up. The cheeks of the clogs terminate, at their upper ends, in suitable lugs for the attachment of the links, by which the bar is suspended from the car-body.

What we claim as our invention, and desire to secure by Letters Patent, is—

1. A brake-bar composed of a center-beam, A, bound with a wrought-iron strap, B, which wholly encircles it, and has massive ends for the attachment of the clogs, substantially as specified.

2. The brake-bar composed of the parts A B $b$ $b$ and wrought-iron clogs C, substantially as and for the purpose specified.

3. The clogs or brake-blocks C, constructed with center bearings $c^1$ $c^1$ and a cross-bar, $c^2$, in combination with the shoes D provided with hook-formed lugs $d$ $d'$, and the locking-bolt E, substantially as and for the purpose specified.

In testimony whereof we have signed our names to this specification in the presence of two subscribing witnesses.

WM. WARWICK.
HENRY C. DUGGAN.

Witnesses for WARWICK:
  ANDREW HUMBERT,
  OWEN O. H. WEIDNER.
Witnesses for DUGGAN:
  J. J. McCORMICK,
  ENOCH J. TREVITT.